United States Patent
Sun

(10) Patent No.: US 8,462,938 B2
(45) Date of Patent: Jun. 11, 2013

(54) POWER SOURCE CIRCUIT FOR USE IN DIGITAL SUBSCRIBER LINE MODEM

(75) Inventor: Shan-Kuo Sun, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 688 days.

(21) Appl. No.: 12/720,630

(22) Filed: Mar. 9, 2010

(65) Prior Publication Data

US 2011/0110407 A1    May 12, 2011

(30) Foreign Application Priority Data

Nov. 9, 2009   (CN) .......................... 2009 2 0314352

(51) Int. Cl.
*H04M 1/00* (2006.01)
*H04M 9/00* (2006.01)

(52) U.S. Cl.
USPC .......................................... 379/413

(58) Field of Classification Search
USPC ................................................. 379/413
See application file for complete search history.

(56) References Cited

U.S. PATENT DOCUMENTS

2004/0264224 A1* 12/2004 Jang et al. ....................... 363/97

* cited by examiner

*Primary Examiner* — Alexander Jamal
(74) *Attorney, Agent, or Firm* — Altis Law Group, Inc.

(57) ABSTRACT

A power source circuit is connected to a power source and a digital subscriber line (DSL) modem. The power source circuit includes a boosting converter, a storage capacitor, a voltage converter, a first switch, a second switch, and a trigger. The boosting converter boosts an input voltage of the power source. The storage capacitor charges by the boosted voltage. The voltage converter converts the input voltage of the power source into a rated working voltage of the DSL modem. The trigger triggers the first switch to electrically connect the storage capacitor to the voltage converter and the second switch to electrically connect the power source to the voltage converter.

20 Claims, 2 Drawing Sheets

POWER SOURCE CIRCUIT FOR USE IN DIGITAL SUBSCRIBER LINE MODEM

BACKGROUND

1. Technical Field

The present disclosure relates to power source circuits, and particularly, to a power source circuit for use in a digital subscriber line (DSL) modem.

2. Description of Related Art

DSL modems typically include a storage capacitor. The storage capacitor charges when the DSL modem is working properly and discharges to provide power for the DSL modem for a brief period in case of power failure. As such, the DSL can send a dying gasp signal to a digital subscriber line access multiplexer (DSLAM) where the DSL modem is connected for a brief period without external power. Thus, the DSLAM can release a channel assigned to the DSL modem to increase network resource efficiency.

However, the DSL modems typically work at a relatively low voltage. Therefore, to charge with sufficient charge to be a successful temporary power supply, it is required to increase a capacitance of the storage capacitor.

However, cost and size of the storage capacitor will undesirably increase with the increase of the capacitance.

Therefore, the DSL modems typically deploy a booster transformer to increase the input voltage before charging the storage capacitor. However, the booster transformer wastes power, decreasing power efficiency.

Therefore, it is desirable to provide a power source circuit for a DSL modem, which can overcome the above-mentioned limitations.

DETAILED DESCRIPTION

Figure 1:
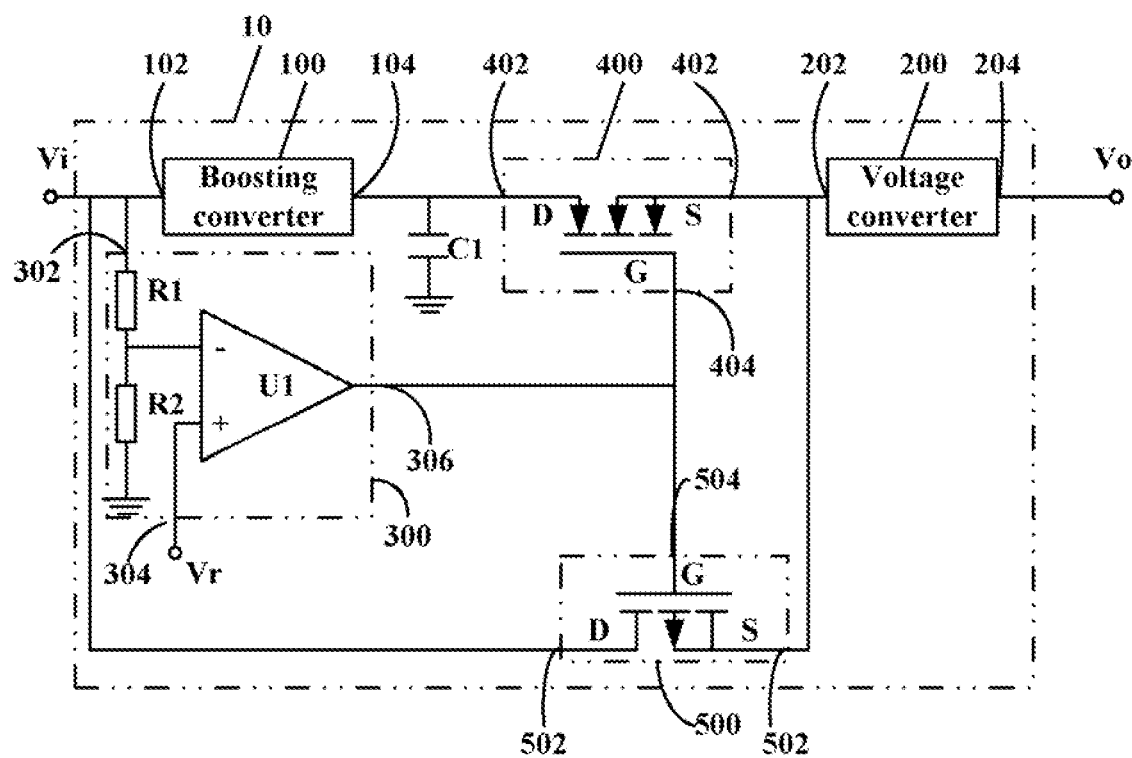
FIG. 1 is a circuit diagram of an exemplary embodiment of a power source circuit.

Referring to FIG. 1, an exemplary embodiment of a power source circuit 10 may be used in a DSL modem (not shown). The power source circuit 10 includes a boosting converter 100, a storage capacitor C1, a voltage converter 200, a trigger 300, a first switch 400, and a second switch 500.

The boosting converter 100 includes a boosting input 102 and a boosting output 104. The boosting input 102 is connected to a power source (not shown) for receiving an input voltage Vi typically of about 15V from the power source. The boosting converter 100 boosts the received input voltage Vi and outputs a boosted voltage via the boosting output 104.

The storage capacitor C1 is interposed between the boosting output 104 and the ground. The storage capacitor C1 is charged by the boosted voltage. As such, a capacitance of the storage capacitor C1 can be relatively low.

The voltage converter 200 includes a converter input 202 and a converter output 204. The converter input 202 is connected to the power source through the second switch 500 and configured for receiving the input voltage Vi when the second switch 500 is on (see below). The voltage converter 200 converts the input voltage Vi into a rated working voltage Vo typically of about 3.3V of the DSL modem and outputs the rated working voltage Vo via the converter output 204.

The trigger 300 includes a sampling input 302, a reference input 304, and a control output 306. The sampling input 302 is connected to the power source. The reference input 304 is connected to a reference voltage input (labeled as Vr) and receives a reference voltage Vr typically of about 1.2V. The trigger 300 generates a control signal according to the input voltage Vi and the reference voltage Vr. In particular, for example, the trigger 300 includes a comparator U1, a first resistor R1, and a second resistor R2. The negative input of the comparator U1 is connected to the sampling input 302 through the first resistor R1 and to the ground through the second resistor R2. The positive input of the comparator U1 is connected to the reference input 304. As such, the input voltage Vi is divided by the first resistor R1 and the second resistor R2. When the divided voltage on the second resistor R2

$$\left(\text{e.g., } \frac{R2 * Vi}{R1 + R2}\right)$$

is greater than the rated working voltage Vr, the control signal is a logic low level (e.g., logical "0"). When the divided voltage on the second resistor R2 is smaller than the rated working voltage Vr, the control signal is a logic high level (e.g., logical "1").

The first switch 400 includes two first conducting terminals 402 and a first control terminal 404. The two first conducting terminals 402 are connected to the storage capacitor C1 and the converter input 202 respectively and the first control terminal 404 is connected to the control output 306. The first switch 400 controls connection of the two first conducting terminals 402, according to the control signal. That is, the control signal determines whether an electrical paths from the storage capacitor C1 to the voltage converter 200 is broken or not broken. In this embodiment, the first switch 400 is an n-channel metal-oxide-semiconductor field-effect transistor (MOSFET), wherein the drain (D) and the source (S) function as the two first conducting terminals 402, and the gate (G) functions as the first control terminal 404. As such, when the control signal is a logic low level, the first switch 400 is off (that is, the connection between the two first conducting terminals 402 is broken). When the control signal is a logic high level, the first switch 400 is on (that is, the two first conducting terminals 402 is electrically connected).

The second switch 500 includes two second conducting terminals 502 and a second control terminal 504. The two second conducting terminals 502 are connected to the power source and the converter input 202 respectively and the second control terminal 504 is connected to the control output 306. The second switch 500 controls connection of the two second conducting terminals 502, according to the control signal. That is, the control signal determines whether an electrical paths from the power source to the voltage converter 200 is broken or not broken. In this embodiment, the second switch 500 is an p-channel metal-oxide-semiconductor field-effect transistor (MOSFET), wherein the drain (D) and the source (S) function as the two second conducting terminals 502, and the gate (G) functions as the second control terminal 504. As such, when the control signal is a logic low level, the second switch 500 is on (that is, the two second conducting terminals 502 is broken). When the control signal is a logic high level, the second switch 500 is on (that is, the two second conducting terminals 502 is electrically disconnected).

The first resistor R1 and the second resistor R2 are structured and arranged so when the input voltage Vi is greater than"

$$\frac{(R1+R2)Vo}{R2},$$

the DSL cable modem can work properly, and accordingly the first switch 400 is off and the second switch 500 is one, according to the logic low level control signal. The DSL modem is powered by the power source, the boosting converter 100 becomes idle after the storage capacitor C1 is fully charged. In contrast, when the input voltage Vi is smaller than $$\frac{(R1+R2)Vo}{R2},$$

the DSL modem cannot work properly, and the first switch 400 becomes on while the second switch 500 becomes off. The voltage converter 200 is connected to the storage capacitor C1 according to the high logic level control signal. As such, the storage capacitor C1 discharges to temporarily power the DSL modem so that the DSL can successfully send a dying gasp signal. It is noteworthy that by employing the second switch 500, discharging current of the storage capacitor C1 is prevented from reflux back to the power source.

It should be understood that the trigger 300 is not limited to this embodiment. Other equating configurations that can sample the input voltage and generate the control signal based on the input voltage can be employed instead. The first switch 400 and the second switch 500 also should not be limited to this embodiment. Other configurations that can block or conduct the electrical paths can be employed instead.

Figure 2:
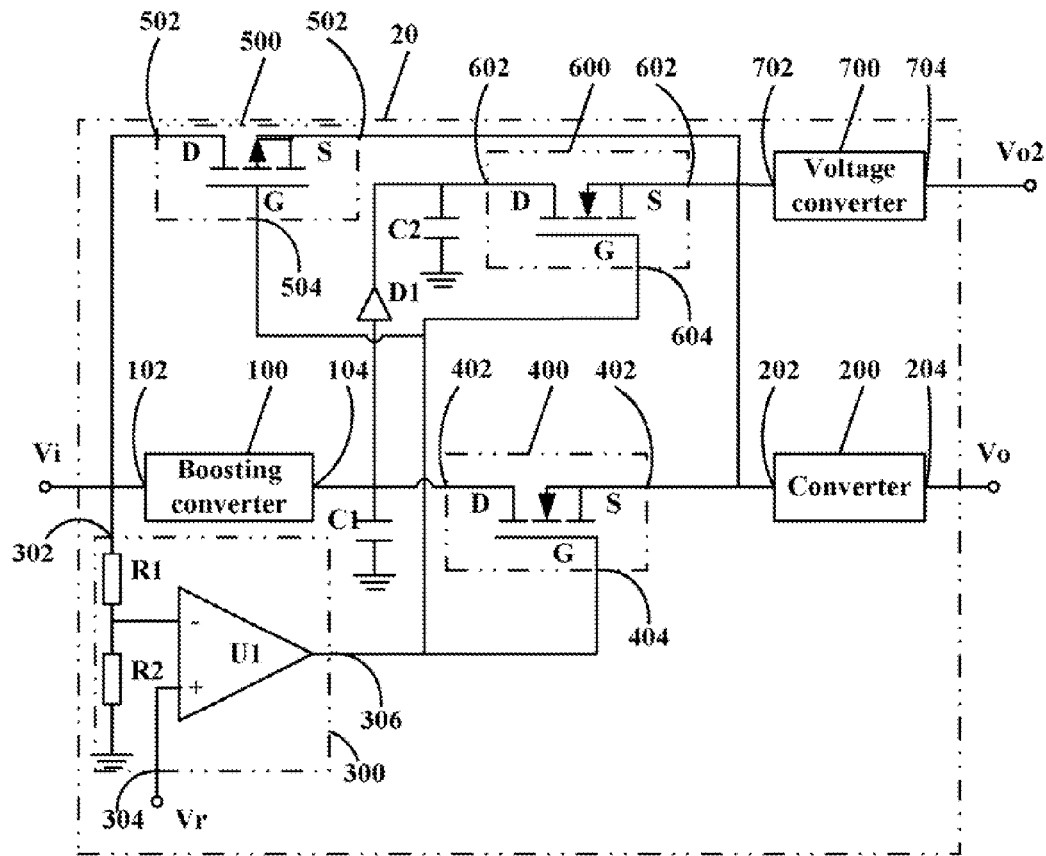
FIG. 2 is a circuit diagram of another exemplary embodiment of a power source circuit.

Referring to FIG. 2, another exemplary embodiment of a power source circuit 20 is substantially similar to the power source circuit 10 but further includes a diode D1, a second storage capacitor C2, and a third switch 600, and a second voltage converter 700.

The anode of the diode D1 is connected to the boosting output 204 and the cathode of the diode D1 is grounded through the storage capacitor C2. The third switch 600 also includes two third conducting terminals 602 and a third control terminal 604. The third switch 600 is also an n-channel metal-oxide-semiconductor field-effect transistor (MOSFET), wherein the drain (D) and the source (S) function as the two third conducting terminals 602, and the gate (G) functions as the third control terminal 604. The second voltage converter 700 also includes a second converter input 702 and a second converter output 704. The second converter input 702 is connected to the power source through the second switch 500 too. The second voltage converter 700 converts the input voltage Vi into another working voltage Vo2 typically of about 12V of the DSL modem. One of the third conducting terminals 602 (i.e., the drain D) is connected to the capacitor C2 and the other (i.e., the source S) is connected to the second converter input 702. The third control terminal 604 (i.e., the gate G) is connected to the control output 306 too.

The capacitances of the storage capacitors C1 and C2 are typically different, depending on requirements of temporary power supplies of the voltage converter 200 and the second voltage converter 700 respectively. In this embodiment, a voltage on the storage capacitor C2 is higher than that of the storage capacitor C1. The diode D1 is employed to prevent the discharging of current of the storage capacitor C2 from flowing to the storage capacitor C1.

While various exemplary and preferred embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A power source circuit connected to a power source and a digital subscriber line (DSL) modem, the power source circuit comprising:
    a boosting converter configured to boost an input voltage of the power source;
    a storage capacitor configured to be charged by the boosted voltage;
    a voltage converter configured to convert the input voltage of the power source into a rated working voltage of the DSL modem;
    a first switch and a second switch; and
    a trigger configured to trigger the first switch to electrically connect the storage capacitor to the voltage converter and trigger the second switch to electrically connect the power source to the voltage converter;
    wherein the voltage converter comprises a converter input connected to the power source through the second switch, and a converter output configured to output the rated working voltage of the DSL modem.

2. The power source circuit of claim 1, wherein the boosting converter comprises a boosting input connected to the power source, and a boosting output configured to output the boosted voltage.

3. The power source circuit of claim 2, wherein the storage capacitor is interposed between the boosting output and ground.

4. The power source circuit of claim 1, wherein the trigger comprises a sampling input, a reference input, and a control output, the sampling input being connected to the power source to sample the input voltage of the power source, the reference input being connected to a reference voltage input and configured to receive a reference voltage, the control output being configured to output, a control signal according to the input voltage of the power source and the reference voltage to trigger the first switch and the second.

5. The power source circuit of claim 4, wherein the trigger comprises a comparator, a first resistor, and a second resistor, the negative input of the comparator being connected to the sampling input through the first resistor and to the ground through the second resistor, the positive input of the comparator being, connected to the reference input.

6. The power source circuit of claim 4, wherein the first switch comprises two first conducting terminals and a first control terminal, one of the first conducting terminals being connected to the storage capacitor, the other first conducting terminal being connected to the voltage converter, the control terminal being connected to the control output to receive the control signal and configured to connect or disconnect the two conducting terminals based upon the control signal.

7. The power source circuit of claim 6, wherein when the control signal is a high logic level, the two conducting terminals connect with each other.

8. The power source circuit of claim 6, wherein when the control signal is a low logic level, the two conducting terminals disconnect from each other.

9. The power source circuit of claim 6, wherein the switch a n-channel metal-oxide-semiconductor field-effect transistor (MOSFET), wherein the drain and the source of the n-channel MOSFET function as the two conducting terminals, and the gate of the n-channel MOSFET functions as the control terminal.

10. The power source circuit of claim 4, wherein the second switch comprises two second conducting terminals and a second control terminal, one of the second conducting terminals being connected to the power source, the other second conducting terminal being connected to the voltage converter, the control terminal being connected to the control output to receive the control signal and configured to connect or disconnect the two conducting terminals based upon the control signal.

11. The power source circuit of claim 10, wherein when the control signal is a high logic level, the two conducting terminals disconnect from each other.

12. The power source circuit of claim 10, wherein when the control signal is a low logic level, the two conducting terminals connect with each other.

13. The power source circuit of claim 10, wherein the switch a p-channel metal-oxide-semiconductor field-effect transistor (MOSFET), wherein the drain and the source of the n-channel MOSFET function as the two second conducting terminals, and the gate of the n-channel MOSFET functions as the second control terminal.

14. The power source circuit of claim 1, further comprising a diode, a second storage capacitor, a third switch, and a second voltage converter, the charged voltage of the storage capacitor being smaller than that of the second storage capacitor, the anode of the diode being connected to the boosting converter, one terminal of the second storage capacitor being connected to the cathode of the diode and the other terminal of the additional storage capacitor being grounded, the third switch being configured to connect or disconnect the second voltage converter to the additional storage capacitor under control of the trigger; the second voltage converter being connected to the power source via the second switch too.

15. A power source circuit connected to a power source and a digital subscriber line (DSL) modem, the power source circuit comprising:
   a boosting converter configured to boost an input voltage of the power source;
   a storage capacitor configured to be charged by the boosted voltage;
   a voltage converter configured to convert the input voltage of the power source into a rated working voltage of the DSL modem;
   a first switch and a second switch; and
   a trigger configured to trigger the first switch to electrically connect the storage capacitor to the voltage converter in case of failure of the power source or otherwise trigger the second switch to electrically connect the power source to the voltage converter.

16. The power source circuit of claim 15, wherein the trigger comprises a sampling input, a reference input, and a control output, the sampling input being connected to the power source to sample the input voltage of the power source, the reference input being connected to a reference voltage input and configured to receive a reference voltage, the control output being configured to output a control signal according to the input voltage of the power source and the reference voltage to trigger the first switch and the second.

17. The power source circuit of claim 16, wherein the trigger comprises a comparator, a first resistor, and a second resistor, the negative input of the comparator being connected to the sampling input through the first resistor and to the ground through the second resistor, the positive input of the comparator being connected to the reference input.

18. The power source circuit of claim 16, wherein the first switch comprises two first conducting terminals and a first control terminal, one of the first conducting terminals being connected to the storage capacitor, the other first conducting terminal being connected to the voltage converter, the control terminal being connected to the control output to receive the control signal and configured to connect or disconnect the two conducting terminals based upon the control signal.

19. The power source circuit of claim 16, wherein the second switch comprises two second conducting terminals and a second control terminal, one of the second conducting terminals being connected to the power source, the other second conducting terminal being connected to the voltage converter, the control terminal being connected to the control output to receive the control signal and configured to connect or disconnect the two conducting terminals based upon the control signal.

20. The power source circuit of claim 15, further comprising a diode, a second storage capacitor, a third switch, and a second voltage converter, the charged voltage of the storage capacitor being smaller than that of the second storage capacitor, the anode of the diode being connected to the boosting converter, one terminal of the second storage capacitor being connected to the cathode of the diode and the other terminal of the additional storage capacitor being grounded, the third switch being configured to connect or disconnect the second voltage converter to the additional storage capacitor under control of the trigger; the second voltage converter being connected to the power source via the second switch too.

* * * * *